INVENTOR.
RALPH A. WITHROW
BY Martin E Anderson
ATTORNEY

United States Patent Office 2,748,798
Patented June 5, 1956

2,748,798

HIGH PRESSURE CHECK VALVES

Ralph A. Withrow, Denver, Colo.

Application January 7, 1952, Serial No. 265,257

2 Claims. (Cl. 137—533.17)

This invention relates to improvements in check valves and has reference more particularly to a check valve designed for high pressure fluid control.

Steam, gases, and liquids are today being employed at very high temperatures and pressures with the result that check valves of conventional construction soon wear away due to the cavitation action of high velocity fluids.

It is the object of this invention to produce a check valve of great strength that can withstand the highest pressures now employed and which shall be so designed that there will be no wiredrawing effect due to restricted openings.

Another object is to produce a check valve that will open in response to comparatively small pressure differentials and when it moves to open position will provide a passage having a greater total cross sectional area than either the inlet or the outlet openings with which it communicates.

The above and any other objects that may become apparent as the description proceeds are attained by means of a construction, and arrangement of parts that will now be described in detail for which purpose reference will be had to the accompanying drawing in which the invention has been illustrated and in which.

Figure 1:
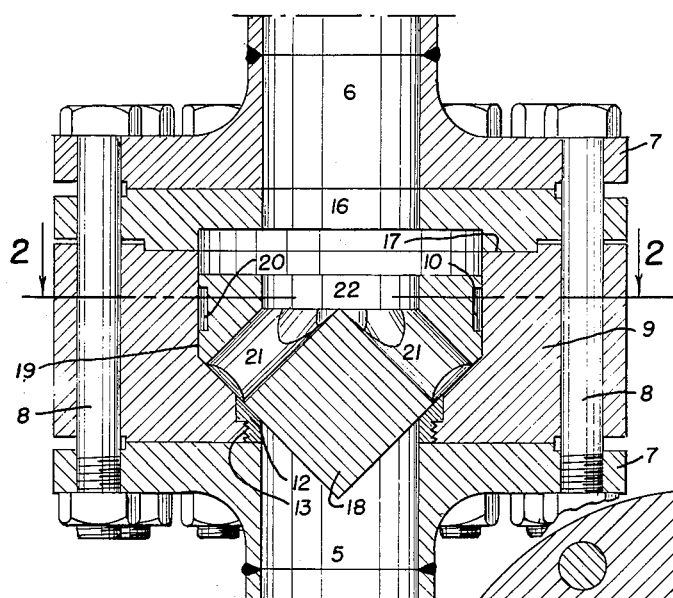
Figure 1 is a diametrical section taken on line 1—1 Figure 2.

Referring now to the drawing reference number 5 designates a pipe that is connected with a source of fluid under pressure, such as a steam boiler or with the outlet port of a high pressure fluid pump and 6 designates a pipe that leads from the valve to a machine or other element where the fluid is to be used, as for example to a steam turbine. Pipes 5 and 6 are provided with the conventional coupling flanges 7 which have a series of holes for reception of bolts 8.

The valve that forms the subject of this invention is positioned between two coupling flanges and consists of a body member 9 of cylindrical shape whose outside diameter is the same as that of the flanges. Member 9 has a central hole 10 which may be of any suitable diameter but must, of course, have a larger diameter than the inside diameters of 5 and 6. The wall of opening 10 is cylindrical for a portion of its length and terminates in an inwardly flaring frusto-conical surface 11, which has been shown as inclined at an angle of 45 degrees to the axis of the opening but which may have any other desired inclination. The lower edge of the frusto-conical surface terminates in a narrow cylindrical wall 12 which is followed by another cylindrical zone 13 that is threaded. A valve seat 14 of hard metal is secured in the lower end of the opening and forms a continuation of the frusto-conical surface 11, as shown. A cover member 15 is positioned on top of the body 9 and is provided with a central opening 16 of the same or larger diameter than that of pipe 6. The adjacent surfaces of body 9 and cover 15 are preferably provided with centering grooves and flanges 17, as shown. Members 9 and 15 have holes for the reception of the clamping bolts 8.

Positioned in opening 10 is a movable valve member 18 which has a cylindrical wall 19, of a diameter slightly less than the diameter of opening 10. Wall 19 is preferably provided with a groove 20. Cylindrical wall 19 serves as a guide for valve 18 and therefore the parts are so dimensioned as to provide an easy sliding fit. That portion of valve 18 below the cylindrical zone 19 is conical, the sides being inclined at the same angle as surface 11 so that when the valve seats, as in Figure 1, it forms a tight seal.

Figure 2:
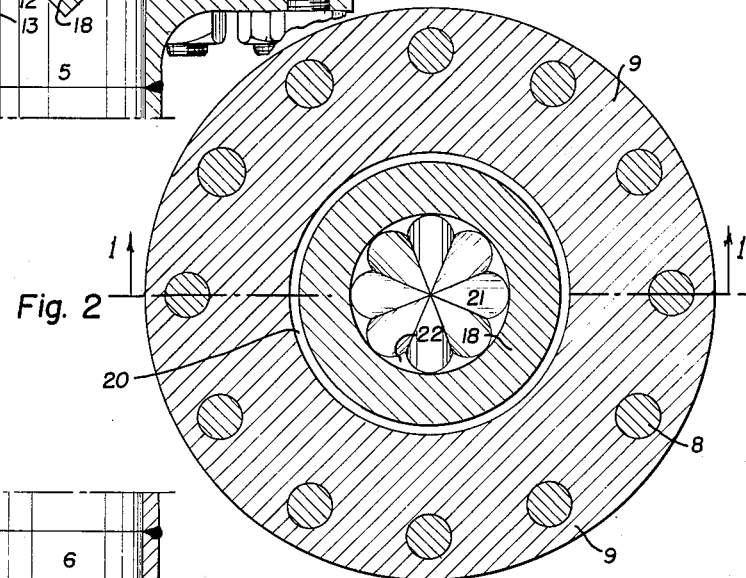
Figure 2 is a transverse section taken on line 2—2 Figure 1.
Figure 3:
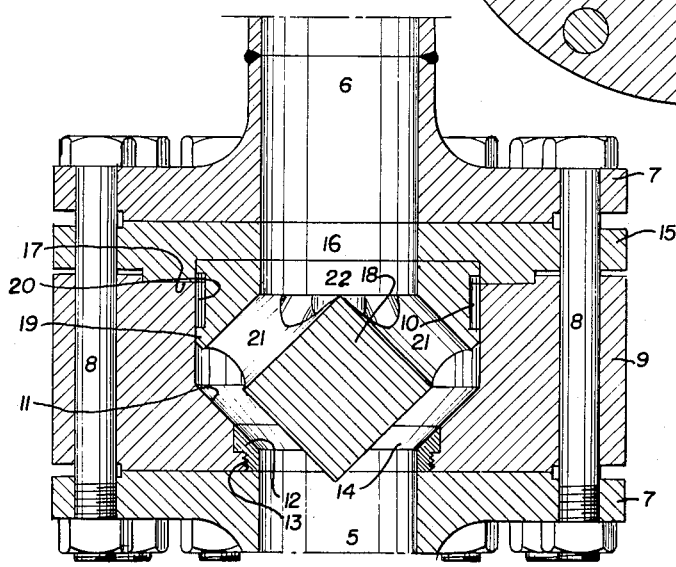
Figure 3 is a diametrical section, similar to that shown in Figure 1 and shows the parts in valve open position.

In order that fluid may pass when valve 18 is in the raised position, shown in Figure 3, it is provided with a plurality of holes 21, eight have been shown, in the drawing. These holes are preferably perpendicular to the inclined surface of the valve member and terminate in the cylindrical depression 22. Since holes 21 intersect each other at their upper ends they will have the appearance shown in Figure 2, when viewed from above. The diameter of holes 21 is so selected that the sum of their cross sectional areas is somewhat greater than the interior cross sectional area of pipe 6 and the vertical movement of the valve member is such that the area of the opening between the conical side of the valve and the valve seat is at least as large as the combined cross sectional area of holes 21.

Valve member 18 occupies the position shown in Figure 1 unless there is an upward flow of fluid in the pipes. If the fluid pressure above the valve decreases to a point lower than the pressure below, fluid will tend to flow upwardly and lifts the valve member to the position shown in Figure 3 whereupon the fluid can flow freely. Since the total area of the passages through valve member 18 is greater than the area of the pipe on the discharge side there will not be any increase in the velocity of the fluid in its passage from pipe 5 to pipe 6 and hence no excessive wear. When the pressure differential ceases, valve 18 returns to its closed position as shown in Figure 1 and if the pressure in pipe 5 suddenly decreases, due to a break in pipe 5 or for any other reason, there will be no reverse or downward flow of fluid from pipe 6.

The parts are rugged and are designed to resist the highest pressure in use today.

The valve can be positioned between adjacent coupling flanges in the manner shown and can therefore be added to any pipe system without any changes. The several surfaces are carefully machined and form tight joints without gaskets but gaskets may be added wherever desired.

What is claimed as new is:

1. A check valve for use in high pressure fluid conduits, comprising a body member having a cylindrical opening terminating at one end in a frusto-conical valve seat, a cover for the opening, the cover having an opening concentric with the opening in the body member, a solid metal valve member positioned in the opening in the body member, said valve member having a cylindrical portion fitting the corresponding wall surface of the body member with an easy sliding fit, and a conical surface tapered to engage the valve seat in the body member, the valve member having a central flat bottomed cup-like depression in its upper surface and a plurality of holes from the conical surface to the interior of the depression, the holes terminating in the surface of the bottom of the depression, the axes of the holes intersecting at a point and above the upper surface of the bottom, the combined cross sectional areas of the holes being at least as great as that of the cup-like depression and at least as great as that of the opening in the cover, said holes communicating with the outlet side of the valve through said depression, the cylindrical portion of the valve member being sufficiently shorter than the corresponding cylindrical portion of the opening in the body member to permit the frusto-conical and conical valve surfaces to separate sufficiently to provide a passage whose cross sectional area is at least as great as the combining cross sectional areas of said holes whereby wiredrawing and cavitation will be prevented when fluid passes through the valve.

2. A check valve and conduit assembly comprising: a body member placed in a conduit of a fluid flow line and provided with a cylindrical opening extending from the outlet end of the valve to a point within said body member; a cover for the outlet end of the body member, said cover having an opening concentric with the opening in said body member; and a solid metal valve member positioned in the cylindrical opening for substantially free-falling movement therein and terminating at the intake end of the valve in a conical surface of not more than 45°; said body member having a frusto-conical opening interconnecting the cylindrical opening and the intake end of the valve, said frusto-conical opening forming a valve seat tapered to engage the conical surface of the valve member along a substantial area to form a high pressure fluid seal; said valve member having a plurality of holes spaced around the conical surface thereof along the portion which engages the valve seat to permit the passage of fluid through said valve when in open position, said holes extending through the valve member to the outlet end of the valve with their axes forming elements of a conical surface of not more than 45°; the maximum area included between the frusto-conical valve seat and the conical surface of the valve member when the valve is in open position being at least equal to the cross sectional area of the conduit; the combined cross sectional areas of the holes in the valve member being at least equal to the cross sectional area of the conduit; and, the maximum deflection in the direction of the flow of fluid through the valve being 90°.

References Cited in the file of this patent

UNITED STATES PATENTS

| | | |
|---|---|---|
| 50,394 | Shield | Oct. 10, 1865 |
| 681,681 | Collewuie | Sept. 3, 1901 |
| 811,185 | Eyck | Jan. 30, 1906 |
| 1,004,654 | Johnson | Oct. 3, 1911 |
| 1,236,056 | Coleman | Aug. 7, 1917 |
| 1,291,767 | Cogswell | Jan. 21, 1919 |
| 1,498,226 | Beck | June 17, 1924 |
| 1,592,988 | Morse | July 20, 1926 |
| 1,873,782 | Nixon | Aug. 23, 1932 |
| 1,953,443 | Spagliardi | Apr. 3, 1934 |
| 2,179,144 | Buttner | Nov. 7, 1939 |
| 2,234,932 | Schlaupitz | Mar. 11, 1941 |
| 2,614,888 | Nichols | Oct. 21, 1952 |

FOREIGN PATENTS

| | | |
|---|---|---|
| 676,680 | Germany | 1939 |